United States Patent
Agiv

(10) Patent No.: US 8,116,791 B2
(45) Date of Patent: Feb. 14, 2012

(54) SENDING AND RECEIVING TEXT MESSAGES USING A VARIETY OF FONTS

(75) Inventor: Omer Agiv, Ramat Hasharon (IL)

(73) Assignee: Fontip Ltd., Tortola (VG)

( * ) Notice: Subject to any disclaimer, the term of this patent is extended or adjusted under 35 U.S.C. 154(b) by 902 days.

(21) Appl. No.: 12/090,515

(22) PCT Filed: Oct. 31, 2006

(86) PCT No.: PCT/IL2006/001256
§ 371 (c)(1),
(2), (4) Date: Apr. 17, 2008

(87) PCT Pub. No.: WO2007/052264
PCT Pub. Date: May 10, 2007

(65) Prior Publication Data
US 2008/0280633 A1    Nov. 13, 2008

Related U.S. Application Data

(60) Provisional application No. 60/732,385, filed on Oct. 31, 2005.

(30) Foreign Application Priority Data

Nov. 23, 2005 (IL) .......................... 172124
Jan. 17, 2006 (IL) .......................... 173181

(51) Int. Cl.
*H04W 4/00* (2009.01)

(52) U.S. Cl. ......... 455/466; 455/566; 455/557; 455/567
(58) Field of Classification Search .................. 455/466, 455/566, 557, 567
See application file for complete search history.

(56) References Cited

U.S. PATENT DOCUMENTS

| | | | |
|---|---|---|---|
| 6,981,223 B2 * | 12/2005 | Becker et al. ................. | 715/753 |
| 7,167,703 B2 * | 1/2007 | Graham et al. ............... | 455/415 |
| 7,302,254 B2 * | 11/2007 | Valloppillil ................. | 455/414.1 |
| 7,433,681 B2 * | 10/2008 | Rytivaara et al. .......... | 455/412.1 |
| 7,519,380 B2 * | 4/2009 | Park .............................. | 455/466 |
| 2001/0049596 A1 * | 12/2001 | Lavine et al. ..................... | 704/9 |
| 2003/0154446 A1 * | 8/2003 | Constant et al. .............. | 715/531 |

* cited by examiner

*Primary Examiner* — Temica M Beamer
(74) *Attorney, Agent, or Firm* — Mark M. Friedman

(57) ABSTRACT

A method for sending a text message over a telephone network from a sending device to a receiving device. A set of images (or font) is selected by a user of the sending device. The text message is displayed using the set of images on the sending device as a presented rich content message. The sending device uploads the text message and one or more codes indicative of the set of images to a server operatively connected to the telephone network. A message is transmitted from the server to the receiving device, the message including information of the text message and of the set of images. The message presented on the receiving device is the same rich content message previously presented on the sending device. The rich content message presented at the sending and receiving devices preferably includes sounds associated with the set of images.

21 Claims, 7 Drawing Sheets

SENDING AND RECEIVING TEXT MESSAGES USING A VARIETY OF FONTS

FIELD OF THE INVENTION

The present invention relates to messaging between mobile devices in a mobile 5 or cellular network. Specifically, the present invention includes a font server attached to the mobile network which stores sets of images or fonts and thereby reduces resources required for a transmitting mobile device to send rich content messages.

BACKGROUND OF THE INVENTION

Users of mobile devices today can routinely send text messages using instant messaging or short message service (SMS). Typically, only a simple font installed on the mobile device is used to display the text message. More advanced mobile devices contain a few font types and a user may compose a message using these previously installed fonts. However, in order for the text message to appear at the receiving mobile device in exactly the same way as at the sending device, the same font used for sending the message needs to be installed on the receiving device. Unlike in computer networking in which only one or two operating systems are typically used, many operating systems are in use by different mobile device manufacturers. The receiving mobile device and operating system are generally not the same as the transmitting device and operating system. In addition, composition of rich content messages, such as with designed fonts and emoticons requires a large memory capacity which is typically lacking as a resource in mobile devices. The transmission of graphic messages also consumes considerable bandwidth compared with traditional SMS messages, thus increasing the cost of sending such graphic messages.

Moreover, the increasing usage of instant messaging communication which in the world of personal computers enables users to add their personal touch into messages with a variety of font types and moving animations, generates a strong incentive to provide mobile subscribers to have parallel capabilities for text messaging on mobile devices.

In the prior art, some high end mobile devices are equipped with a "strong" processor and with one or more software packages (e.g. Microsoft Photo Editor) for editing graphics. Using such high end mobile devices, the user can write a "text message" in any font installed on the mobile device, save the message as a "Picture", and send the message to the receiver device over the mobile network as an MMS (Multi Media Service) message. This prior art method that the sending device needs to contain a large set of previously installed fonts and a memory consuming installed application for graphics editing software.

Funmail and con Visual provide a service on cellular networks that addresses the need of sending animated messages based on US patent application 20010049596. The disclosure of 20010049596 involves sending a standard SMS to a short-code number containing key words such as "party", "love", "shopping". A program on a remote server distills the keyword from the text, attaches a previously available animation suitable to the keyword to a multimedia message and sends an MMS to the destination number. The disclosure of 20010049596, however, does not provide the users with the experience of composing their own rich content, e.g. colorful and/or graphic text message and the message arrived at the receiving device does not resemble the message which had been sent by the originator, and the user has limited control of the rich content in the transmitted message.

US 20030154446 discloses a method and system which allows users of mobile devices to send and receive character-based, graphically expressive messages using mobile wireless. Specifically, the disclosed method allows users to establish a graphical character-based, messaging personality, including selectable images of the character that convey a certain mood.

There is thus a need for, and it would be highly advantageous to have a system and method for sending messages from, a "sending" mobile device to a "receiving" mobile device through a mobile network and in particular and system and method which require minimal resources of the mobile devices and in which the transmitted and received messages are displayed identically on both the sending device and on the receiving device.

The Short Message Service—Point to Point (SMS-PP) is defined in GSM recommendation 03.40. GSM 03.41 defines the Short Message Service—Cell Broadcast (SMS-CB) which allows messages (advertising, public information, etc.) to be broadcast to mobile users in a specified geographical area. Messages are sent via a store-and-forward mechanism to a Short Message Service Center (SMSC), which will attempt to send the message to the recipient. If the user is not reachable at a given moment, the SMSC will save the message. Later when the user is reachable, the SMSC will retry the delivery process. Both Mobile Terminated (MT), for messages sent to a mobile handset, and Mobile Originating (MO), for those that are sent from the mobile handset, operations are supported. Message delivery is best effort, so there are no guarantees that a message will actually be delivered to its recipient and delay or complete loss of a message is not uncommon, particularly when sending between networks. Users may choose to request delivery reports, which can provide positive confirmation that the message has reached the intended recipient, but notifications for failed deliveries are unreliable at best.

Transmission of the short messages between SMSC and phone can be done 5 through different protocols such as SS7 within the standard GSM MAP framework or TCP/IP within the same standard. Messages are sent with the additional MAP operation forward_short_message, whose payload length is limited by the constraints of the signaling protocol to precisely 140 bytes (140 bytes=140*8 bits=1120 bits). In practice, this translates to either 160 7-bit characters, 140 8-bit characters, or 70 16-bit characters. Characters in languages such as Arabic, Chinese, Korean, Japanese or Slavic languages (e.g. Russian) must be encoded using the 16-bit UCS-2 character encoding (see Unicode). Routing data and other metadata is additional to the payload size. Ref: http://en.wikipedia.org/wiki/Short_message_service Multimedia Messaging Service (MMS) is a standard for a telephony messaging systems that allow sending messages that includes multimedia objects (images, audio, video, rich text) and not just text messages as in Short message service (SMS). MMS is mainly deployed in cellular networks along with other messaging systems like SMS, Mobile Instant Messaging and Mobile E-Mail.

MMS is the evolution of Short Message Service (SMS) (SMS is a text-only messaging technology for mobile networks). With MMS, a mobile device is no longer confined to text-only messages. MMS can send and receive multimedia messages such as graphics, video and audio clips, and so on. MMS has been designed to work with mobile packet data services such as GPRS and 1×.

MMS data flow starts with a subscriber using an MMS client on the mobile phone to compose, address, and send an MMS message to one or more recipients. MMS addresses can be either E.164 phone numbers (e.g., "+18005551212") or RFC 2822 e-mail addresses (e.g., "you@yourdomain.com"). The initial submission by an MMS client to the home MMS Center (MMSC) is accomplished using HTTP with specialized commands and encodings (which are defined in a technical standard specified by the Open Mobile Alliance). Upon reception of the MMS message, the recipient MMSC (MMS Center) sends a notification to the recipient's mobile phone using either an SMS notification, HTTP Push or WAP Push. There are two modes of delivery in MMS: immediate or deferred:

Immediate delivery: When the MMS client on the mobile phone receives the MMS notification, it then immediately (without user intervention or knowledge) retrieves the MMS message from the MMSC that sent the notification. After retrieval, the subscriber is alerted to the presence of a newly arrived MMS message.

Deferred delivery: The MMS client alerts the subscriber that an MMS message is available, and allows the subscriber to choose if and when to retrieve the MMS message.

As with the MMS submission, the MMS retrieval request, whether immediate or deferred, occurs with an HTTP request. The MMSC responds by transmitting the MMS message in an HTTP response to the MMS client, after which the subscriber is finally alerted that the MMS message is available.

The essential difference between immediate and deferred delivery is that the former hides the network latencies from the subscriber, while the latter does not. Immediate or deferred delivery are handset dependent modes, which means that the handset manufacturer can provide the handset in one mode or the other or let the user decide his preference.
MMS-enabled mobile phones enable subscribers to compose and send messages with one or more multimedia parts. Multimedia parts may include text, image, audio and video. These content types should conform to the MMS Standards. For example your phone can send an MPEG-4 video in AVI format, but the other party who is receiving the MMS may not be able to interpret it. To avoid this, all mobiles should follow the standards defined by OMA. Mobile phones with built-in or attached cameras, or with built-in MP3 players are very likely to also have an MMS messaging client—a software program that interacts with the mobile subscriber to compose, address, send, receive, and view MMS messages.
Ref: http://en.wikipedia.org/wiki/Multimedia_Messaging_Service#Application

DEFINITIONS

The term "font" as used herein refers to a set of images which may be presented in a tabular form or array for referencing the images. The term "font" therefore refers both a type face, e.g. a true type font (TTF) file used in a personal computer operating under Microsoft Windows@, and/or any other set of images, e.g. emoticons and/or multimedia information, e.g. sounds associated with the images.

The term "rich content" as in "rich content message" refers to the inclusion in the message of one or more of the following: fonts, color, graphics, imagery, animation and sounds.

The term "message" as used herein refers to a rich content message sent from a server to the receiving device in any protocol including but not limited to the following: Multimedia Messaging Service (MMS) message, a mark up language (e.g. HTML) or other mark up language e.g. extensible markup language (XML), a file attached to an electronic mail message, a text message with alphanumeric data, e.g. ASCII.

The term "image" includes (but is not limited by) the following list of image formats: gif, gif animation, jpeg, jpg, bmp, tiff, avi, mpeg, mpg, png and html.

When a "message" includes one or more sounds associated with the characters and/or images within a composite image, the audio information is stored in any audio file format including but not limited by the following: Advanced Audio Coding File (.aac), Audio Interchange File Format (.aif), MPEG Layer 3 Audio File (.mp3), MPEG Audio File (.mpa), Real Audio (.ra), Real Audio Media (.ram), Windows WAVE Sound File (.wav) and Windows Media Audio (.wma)

The term "telephone network" as used herein refers to a wired network, a wireless or mobile network and/or a cellular telephone network and/or personal communications system of any communications standard.

The term "device" as used herein such as in sending device and/or receiving device, refers to a telephone and/or computer communicating over a telephone network.

SUMMARY OF THE INVENTION

According to the present invention there is provided a method for sending a text message over a telephone network from a sending device to a receiving device. A set of images (or font) is selected by a user of the sending device. The text message is displayed using the set of images on the sending device as a presented rich content message. The sending device uploads the text message and one or more codes indicative of the set of images to a server operatively connected to the telephone network. A message is transmitted from the server to the receiving device, the message including information of the text message and of the set of images. The message presented on the receiving device is the same rich content message previously presented on the sending device. The rich content message presented at the sending and receiving devices preferably includes sounds associated with the set of images. Typically, the set of images is previously downloaded to the sending device from the server. The message transmitted from the server to the receiving device is typically a multimedia message. Alternatively, the message transmitted from the server to the receiving telephone includes the text message and one or more of the codes. Preferably, the text message is edited on the sending device. An encoded text message is produced including characters of the text message and one or more of the codes. The encoded text message is decoded at the server. The editing of the text message at the sending device includes retrieving an image from the set of images, and pasting it into a composite image presented by an application previously installed on the sending device. Alternatively, the editing is performed remotely over a gateway (e.g. Wireless Application Protocol (WAP) or Internet) using an application previously installed on the server. The rich content message is preferably generated as a composite image composed using multiple cells. For each character of the text message, an image is selected from a cell from the set of images by indicating the code. When the selecting of the set of images is performed over a gateway, the composite image is downloaded to the sending device, for displaying on the sending device. The set of images is optionally constructed by superimposing two or more sets of images such as a set of alphanumeric images with a set of background images and the constructed set of images is uploaded to the server. A set of handwritten images of a user of the sending device is optionally uploaded to the server and scanned thereby producing the set of images, and downloaded to the sending device.

According to the present invention there is provided a method for sending a message over a telephone network from a sending device to a receiving device. A text message is edited on the sending device. One or more codes is selected on the sending device indicative of a set of images. A composite image is generated composed using multiple cells. For each character of the text message an image from the set of images is selected from a cell by indicating the code. The composite message is displayed on the sending device and the composite image is transmitted to the receiving device. The composite image is preferably one of (i) a multimedia message, (ii) a Web page or (iii) an attachment file to an electronic mail message. The same composite image is displayed on the receiving device. The set of images is preferably previously downloaded to the sending device from a server connected to the telephone network.

According to the present invention there is provided a program storage device tangibly embodying a set of instructions readable by a processor installed in the sending device which performs the methods as disclosed herein According to the present invention there is provided a method for processing a text message sent over a telephone network from a sending device to a receiving device. A text message and a code indicative of a set of images are received. A multimedia message is transmitted to the receiving device, the multimedia message including information of the text message and of the set of images.

According to the present invention there is provided a font server which performs the method steps as disclosed herein. The font server preferably includes comprising a transactions module which determines billing based on the multimedia message and/or the set of images downloaded to the sending device.

According to the present invention there is provided a program storage device tangibly embodying a set of instructions readable by a processor in the font server for performing the methods as disclosed herein

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
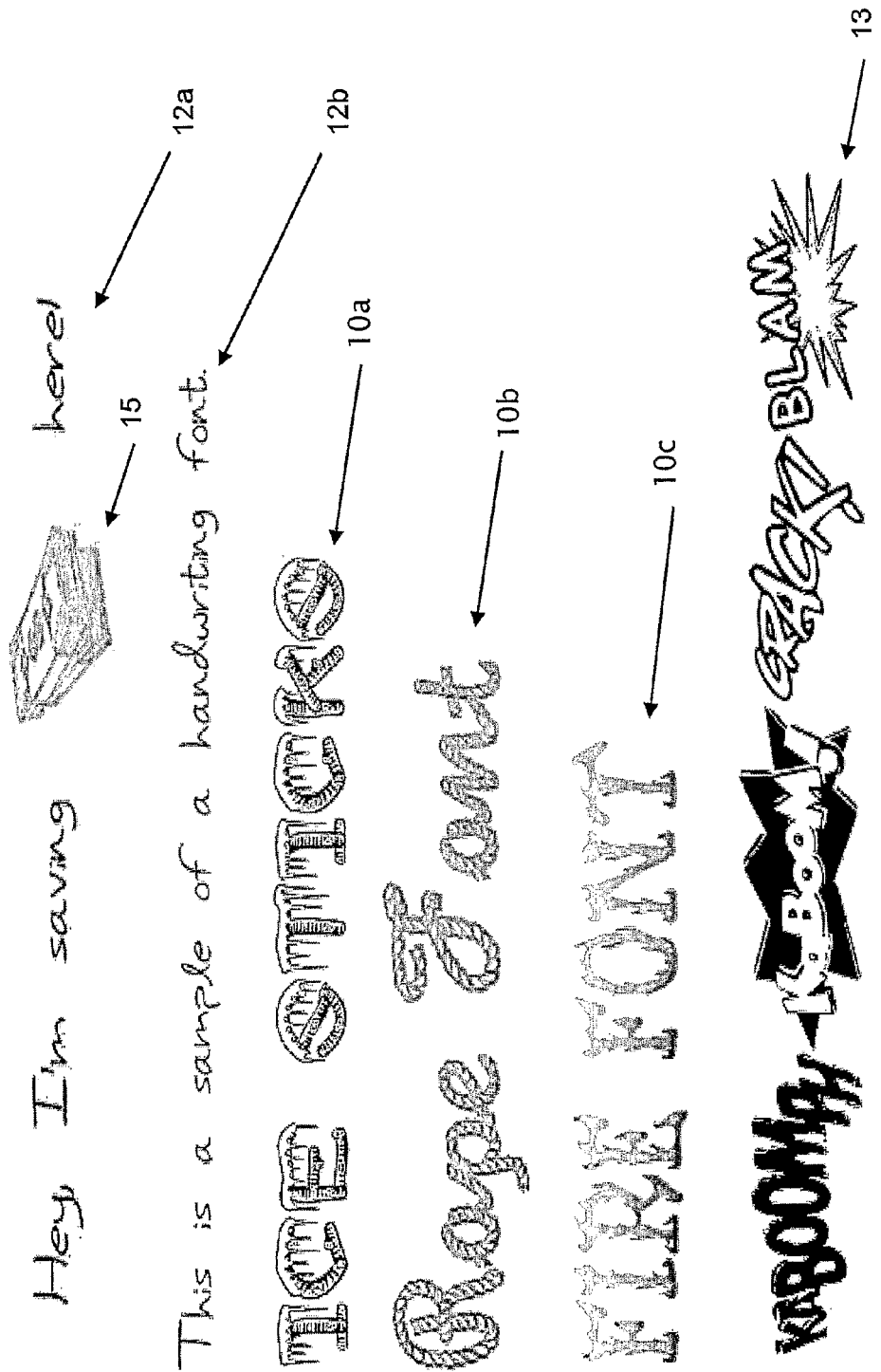
FIG. 1 is a drawing of sample fonts constructed and available for use in transmission and reception of messages according to embodiments of the present invention.

The present invention is of a system and method for sending text messages from, a "sending" mobile device typically a mobile device having limited display and other interface capabilities, such as a cellular telephone to another mobile device (the "receiving" mobile device) through a mobile network. The sending mobile device 5 presents the user with a font menu, and the user selects a given font from the menu. As the user enters her text message into the sending device, the sending device presents the message in the selected font on the display of the sending device. In an embodiment of the present invention, the text message as well as the font information is transmitted to a server, which generates a composite image or rich content message including the text message in the selected font exactly as displayed on the sending device prior to sending. The composite image is forwarded (for example, as a multimedia service (MMS) message) to the receiving mobile device. In this way, the selected font is not required to be stored in memory of the receiving device for the receiving device to reconstruct and display the message as transmitted. Alternatively, the sending mobile device may download fonts from a centralized repository residing on the server, and be configured to generate an image of the message to be displayed at the receiver mobile device. The transmitted image is sent from the sending mobile device for instance as an MMS message. In this way, the image is generated on the sending mobile device rather than on the server.

A feature of some embodiments of the present invention is that the sending mobile device is not required to store in memory the font used in order to display the font and as such memory resources of the sending device are conserved. A font file is provided preferably as an image file by a font server which contains a set of images in the font of interest. The font file is divided into cells, and each cell contains a specific designated character. As the user types in characters on the sending device, an application residing on the sending mobile device retrieves the specific cell associated with requested characters and pastes the cell as an image on the application editor screen of the sending device. Another feature of some embodiments of the present invention is that the sending device does not necessarily need to support a protocol for sending images in the cellular network (e.g. MMS). For devices that do not support such a protocol, an application residing on the sending device may send the message as an SMS message along with a number (a font "code") which represents the selected font to the font server. The font server constructs the message as an image and transmits the message to the receiving device for instance as an MMS message.

It should be noted, that although the discussion herein relates to mobile telephones, the present invention may, by non-limiting example, alternatively be configured as well using other mobile devices such as portable computers, portable digital assistants or handheld computers.

Embodiments of the present invention enable sending of text messages from a mobile device, using different kinds of fonts either standard fonts or custom designed fonts, regardless of the capability of the sending device to support MMS messages, in a highly bandwidth-efficient way. Embodiments of the present invention also provide the ability to use different font types and emoticons within the same text message. One aspect of the present invention relates to the users' experience of composing al personalized, e.g. colorful, rich content message using a number of font types and emoticons regardless the memory capacity of the sending and receiving mobile devices.

By installing on or embedding in the mobile device a simple software application, which preferably requires minimal computation and is suitable for a wide variety of mobile devices, the user can edit and send the personalized rich content messages using a variety of fonts and emoticons embedded in the software, download additional sets of fonts from a remote server, and compose the messages. In order to use minimal resources, the text message preferably includes only metadata referring to the font and other rich content information, e.g. graphic imagery, color and sound. The message is received at a remote server, converted for instance to a GIF/animated GIF picture or a slide show of multiple pictures, and sent to the receiving device by either MMS message or web page such as HTML or as an attachment file to e-mail.

The principles and operation of a system and method of sending messages through a mobile network, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, the present invention aims to provide a method which enables any handset to edit and send messages using different fonts and a variety of emoticons and animations, to mobile devices which receive and view the message regardless type or model of the receiving mobile devices. The invention further discloses a method of using a number of designed fonts and emoticons given the limitation of memory capacity in mobile devices. In addition, the embodiments of the present invention are designed to require minimal bandwidth while sending messages. The invention in different embodiments has several advantages over conventional methods for sending personalized or rich content messages with colorful graphical content and/or audio content as follows:

The sending device is not required to support MMS.

The receiving device is not required to have a special application installed for receiving rich content messages.

Embodiments of the present invention is universally applicable to most kinds of mobile devices and operating systems.

Fonts are not required to be previously installed in memory on both sending and receiving devices. Sending device downloads as required new fonts and emoticons from the server of the present invention.

A single message may be sent with multiple fonts in different parts of the single message.

Transmission and/or receiving of messages is performed with high efficiency of bandwidth.

A graphical message may be sent from a sending device capable only of low resolution display to a receiving device capable of high resolution.

Modular pricing for sending messages is provided based on the message content.

The user can send messages using a large number of fonts and emoticons with little regard as to the memory capacity of the sending device due to a unique method of font construction in the device and to the possibility of downloading new fonts from a remote server.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Referring now to the drawings, FIG. 1 illustrates a number of different fonts for transmitting messages by a sending device to a receiving device over a telephone network, according to embodiments of the present invention. Examples of fonts 10 each with a particular theme are an ice sticks font 10a, a rope font 10b and a fire font 10c. Typically theme fonts 10 are presented in color; for instance fire font 10c is a mixture of bright yellow, orange and red to simulate fire and rope font 10b is colored beige similar to that of rope. Other fonts include handwriting fonts 12. Typically, fonts may include graphics such as a dollar bill graphic 15. Other fonts of which font 13 is an example may include words, or expressions with integrated graphics. Fonts may also include sounds and/or animations associated with the characters and/or graphics images.

Figure 2:
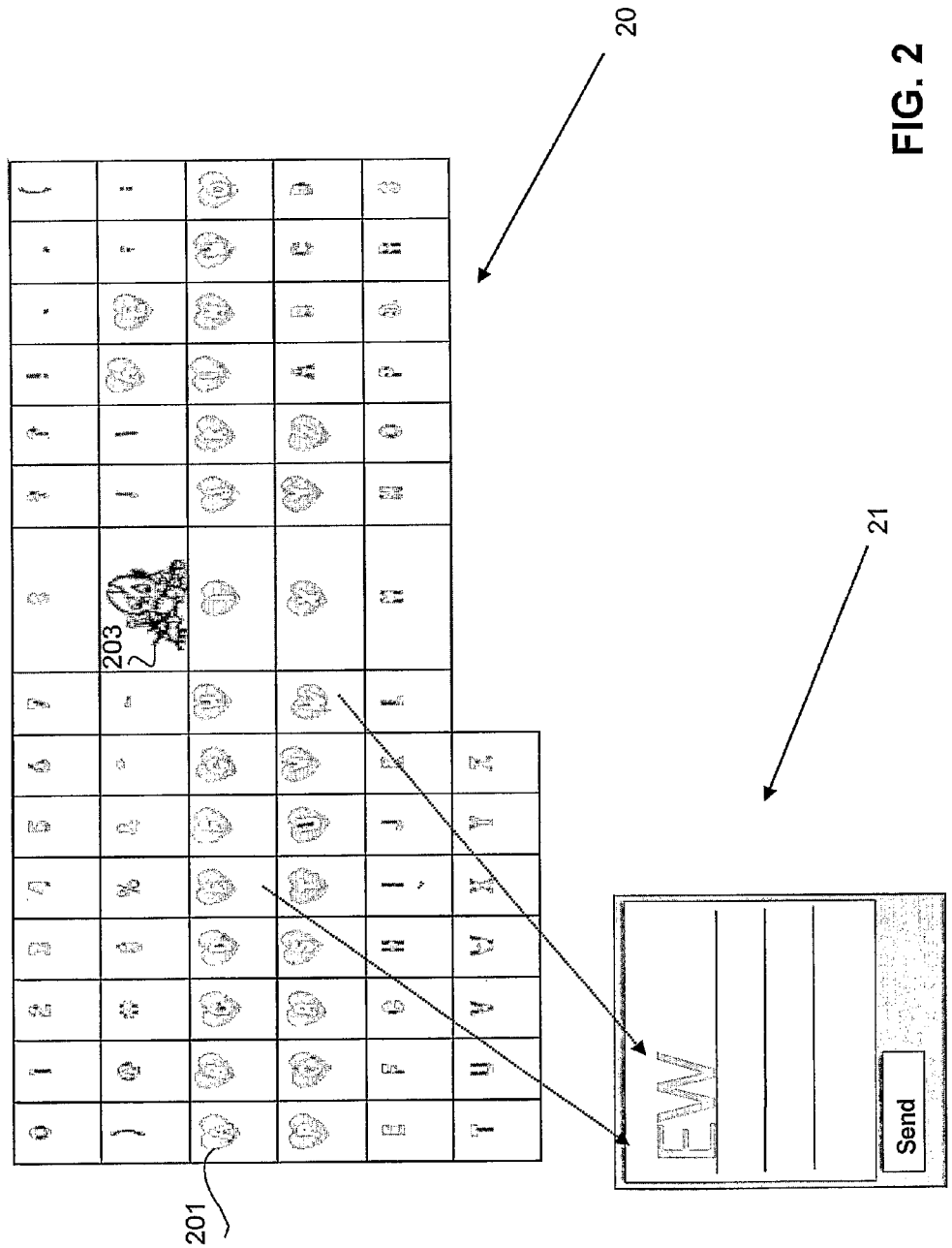
FIG. 2 illustrates a font in tabular form and a process of message construction, according to embodiments of the present invention.

Reference is now made to FIG. 2 which illustrates a font 20 as a set of images or characters in tabular form. Font 20 has an identification code which identifies font 20 and distinguishes font 20 from other fonts. Each character or image in font 20 is positioned in a different cell of the composite image. Construction of a message is based on the set of images by locating individual cells typically using a reference or code indicating position of the image with the set of image. Message construction is performed by indicating a font code and location of images or characters within the font. For instance, when the user types the "w" character, on a sending device, an application installed in the sending device retrieves the "w" image from the cell, "the "w" character is associated by the location code of the "w" image in font 20. The "w" image of font 20 is pasted into the rich content message or composite image on the application editor screen 21 of the sending device.

Figure 3:
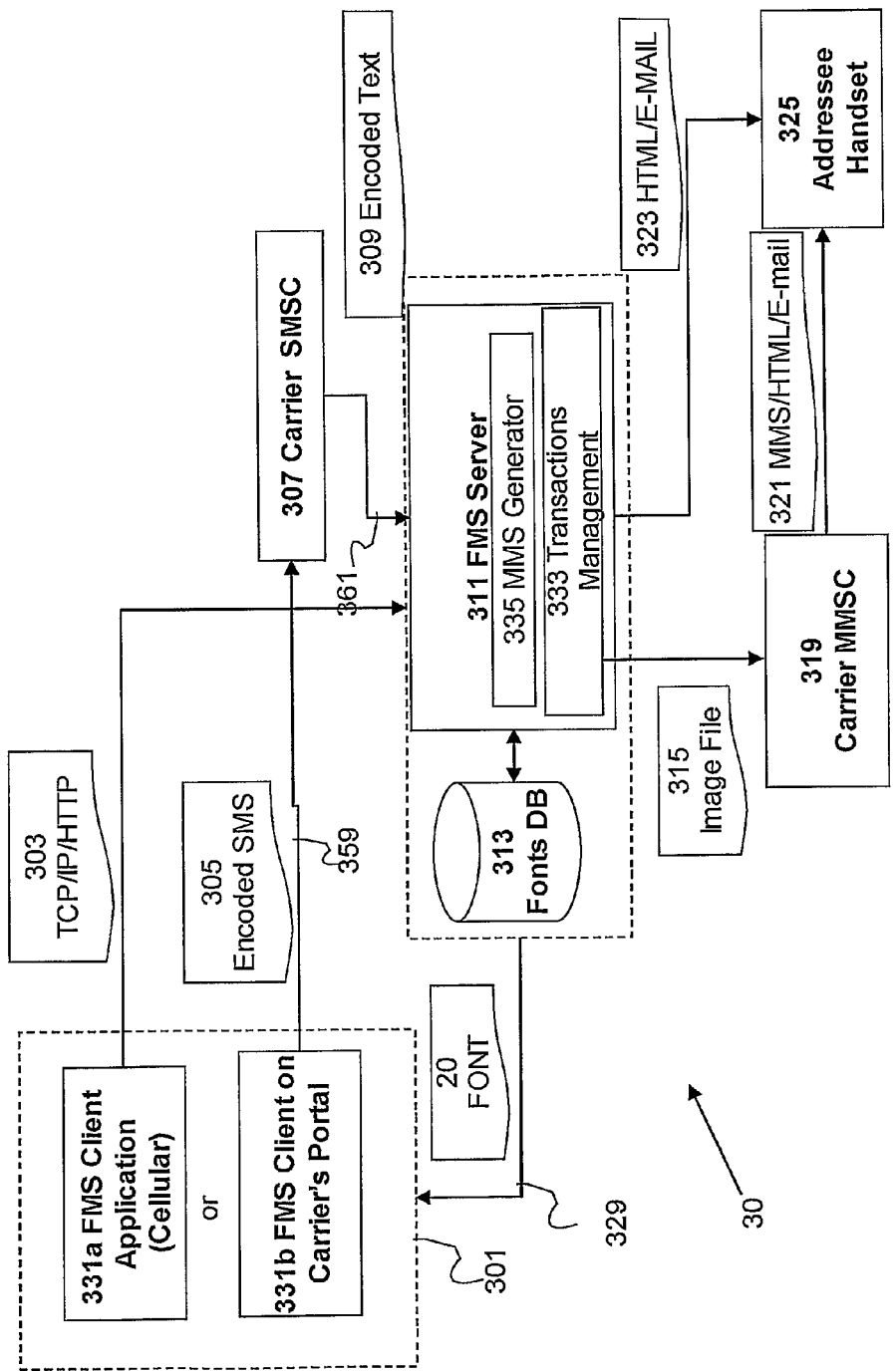
FIG. 3 illustrates schematically a simplified system and method of transmission and reception of rich content messages, according to embodiments of the present invention.
Figure 3A:
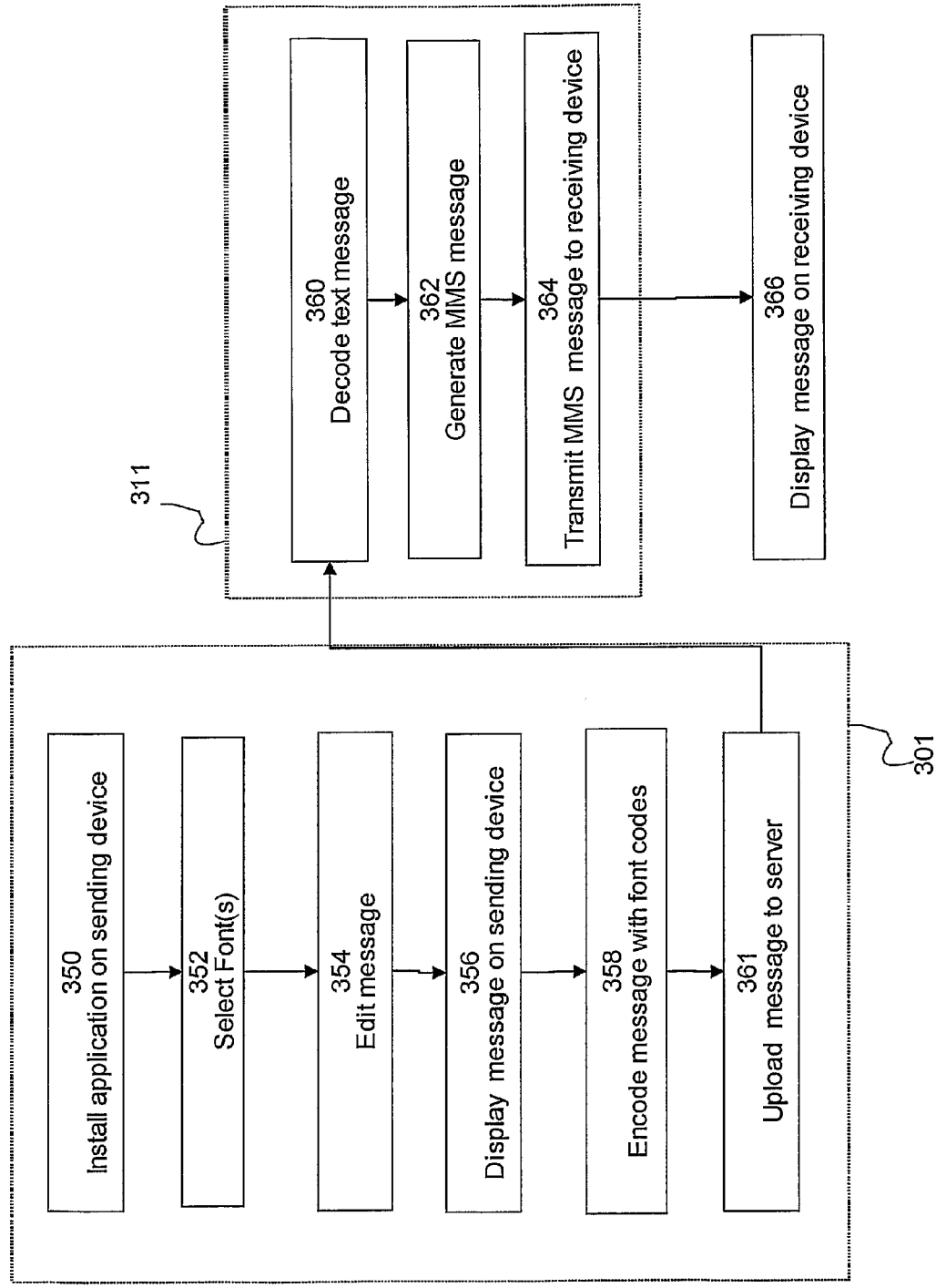
FIG. 3a is a simplified flow diagram of a method, according to an embodiment of the present invention.

Reference is now made to FIGS. 3 and 3a illustrating a system 30 for transmitting and receiving a message, according to embodiments of the present invention. Sending device 301 is preferably a mobile telephone 301 or a mobile computer 301. An application 331 is typically installed (step 350) on sending device 301 for selecting fonts (step 352) and editing (step 354) the message. Application 331 alternatively uses TCP/IP protocol (block 331a) or SMS protocol (block 331b) Application 331 used for editing (step 354) messages may either be embedded in sending device 301 by the device manufacturer or downloaded and installed (step 350) from FMS server 311. FMS server 311 is attached to a database 313 of available fonts (such as font 20). Each font 20 or set of images is coded by a unique identification number and a list of fonts 20 is categorized and updated continuously in database 313 so a user of sending device 301 can easily choose and download (step 329) a font (such as font 20) to sending device 301. Downloading (step 329) a font from server 311 to sending device 301 is performed via any suitable wired or wireless communication method. After obtaining a coded set of fonts available in database 313, then the user is ready to edit (step 354) an FMS message, according to the present invention. Editing (step 354) the text message is performed by typing the text message in application 331 using different selected fonts. Images retrieved from the selected fonts are pasted into application screen 21. In application 331, a menu of font types is available for the user to choose (step 352) one or more times within the same message. The rich content message is displayed (step 356) on sending device 301. After pressing the send button, the edited message is uploaded (step 358) either as a encoded SMS message 305 or as an alphanumeric data message 303 over HTTP, WAP or any other known communication protocol. Message 303,305 preferably contains one or more font codes that defines the font type, color and size in use. Another code, a message code, is preferably attached to message 303,305 which causes data message 303 to be transmitted to or intercepted by remote FMS server 311. The Font Code and the Message Code may be added to message 303, 305 sent by sending device 301 as part of the destination number, or as part of the message content or in any way known method including a free text format.

Using application 331b, the edited message is encoded (step 358) with information defining the selected fonts and the encoded SMS message 305 is transmitted (step 359) to a short message service center (SMSC) 307. SMSC 307 typically stores encoded SMS message 305 and transmits (step 361) an encoded text message 309 to a font message service (FMS) server 311, according to embodiments of the present invention. Alternatively, using application 331a, sending device 301 transfers (step 361) an encoded text message including message and font information using a TCP/IP and/or HTTP message directly to FMS server 311.

FMS server 311 typically includes an MMS generator 335 which inputs encoded text 309 or alphanumeric data 303, decodes (step 360) and constructs (step 362) an MMS message 321 for transmitting to (step 364) and identical display (step 366) on receiving device 325 as the message was displayed (step 356) on sending device 301 based on the one or more font codes included in messages 309 or 303. Message 303 or 309 is opened by MMS generator 335. MMS generator 335 uses the font codes, supported by font database 313, which provide information about the font type, color and size, and optionally position within message 303 or 309, and reconstructs the original message as displayed (step 356) on sending device 301. MMS generator 335 then saves (step 362) message 315 as an image file 315 and sends (step 364) image file 315 to receiving device 325 by one or more of methods: to a multimedia messaging service center (MMSC) 319 or directly as an attachment 323 to e-mail, or as a web page format (e.g. html). MMSC 319 transfers message 321 to receiving device 325 in any format including MMS format, HTTP or as an electronic mail attachment. As received MMS message 321 may contain an amount of content which can not be visualized on one screen page, an application optionally installed on receiving device 325 preferably constructs several graphics pages and saves the message in a slide show using a standard animation in gif format or in any known picture format or a video format.

Transaction management module 333 on remote server 311 preferably analyzes the number of fonts used in a sent message 315, 323 and calculates the billing according to a previously defined price list for each font. For example: the operator may offer the user to send a message 315 using one font type and one emoticon in a fixed price. For using more font types in the message the user will pay more. The operator typically will charge the user according to the complexity (required bandwidth, or time to send) of sent message 315, 323. Alternatively, the operator can also charge a fix price per message or download.

Figure 4:
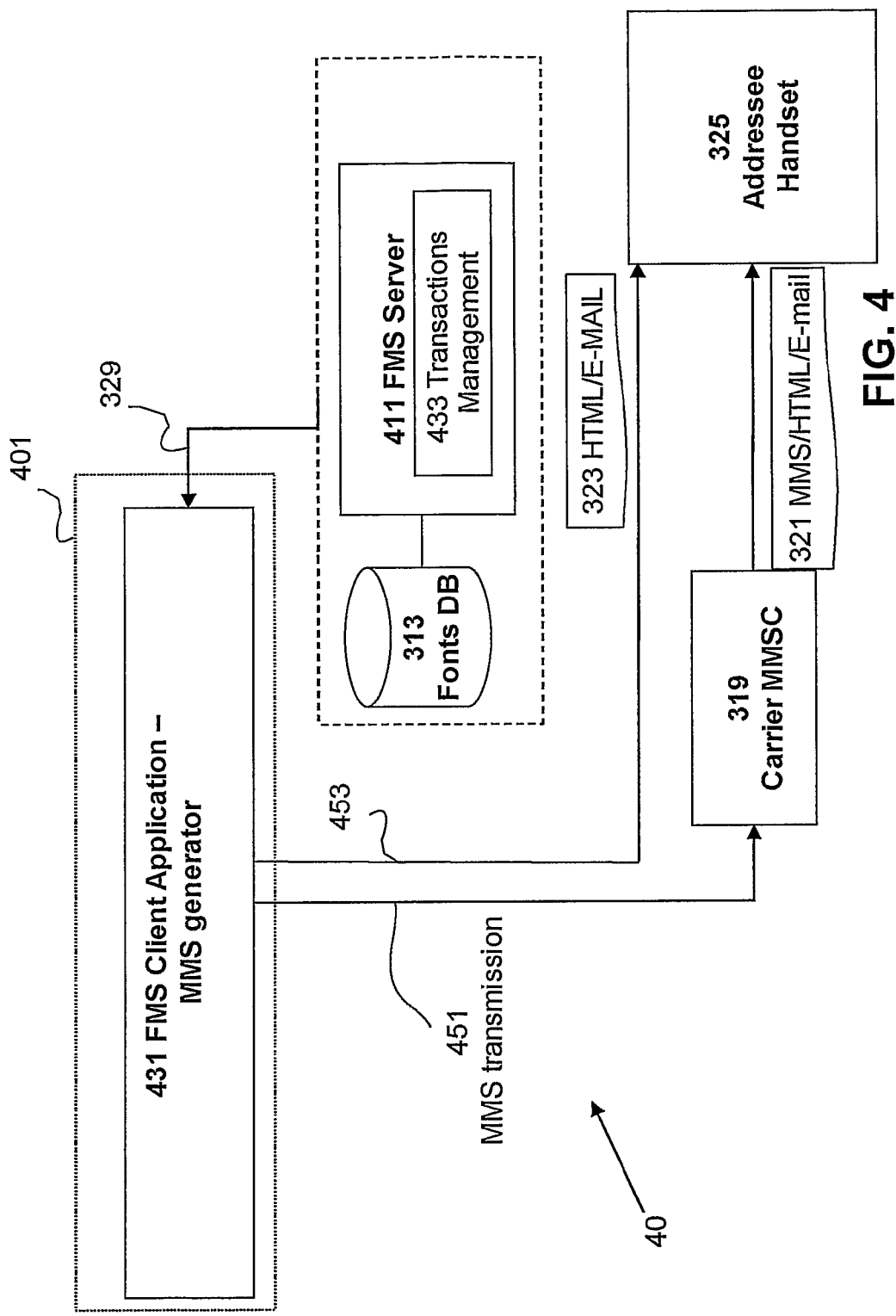
FIG. 4 is a simplified schematic illustration of a system and method of transmission and reception of rich content messages, according to embodiments of the present invention.

Reference is now made to FIG. 4 which illustrates an alternative embodiment 40 of the present invention for sending messages from a sending device 401 to receiving device 325. As in the embodiment of FIG. 3, an application 431 is installed (step 350) for selecting fonts (step 352), a menu of font types is available for the user to choose (step 352) one or more times within the same message. The rich content message is edited (step 354) and displayed (step 356) on the sending device 401. However, after pressing the send button, the edited message is converted into a composite image or rich content message on sending mobile device 401 and sent (step 451) as a regular MMS message 321 (or other animation or web page format) or sent (step 453) as an attachment 323 to e-mail to receiving mobile device 325. The rich content message may include text, i.e. alphanumeric characters, and graphics, symbols and illustration characters, sounds and/or animation as chosen by the user of sending device 401. The rich content message can contain more than one frame and be shown as a slide show in any animation format (including video and picture). FMS server 411 includes a mechanism for downloading (step 329) of fonts to sending device 401. A transactions management module 433 provides for billing of users typically based on the number of downloads and the content downloaded.

Alternatively, embodiment 40 may be configured to route MMS message 321 through FMS server 411 in which case transactions management module 433 preferably provides billing based on number and complexity of messages sent. Moreover, when MMS messages 321 are routed through FMS server 411, a statistics module may be added to FMS server 411 for collecting of information regarding the messages sent. Routing of MMS messages 321 is preferably performed by adding a message code to MMS messages 321. The message code is received at carrier MMSC 319 and upon reading the message code, MMS messages 321 are routed to FMS server 411. After reading statistics and billing information message 321 is transferred by FMS server 411 to receiving device 325. The font code and the message code is preferably added to message 321 sent by sending device 401 as part of the destination identification number, or as part of the message content or in any of the free fields allowed by MMS protocols.

Figure 5:
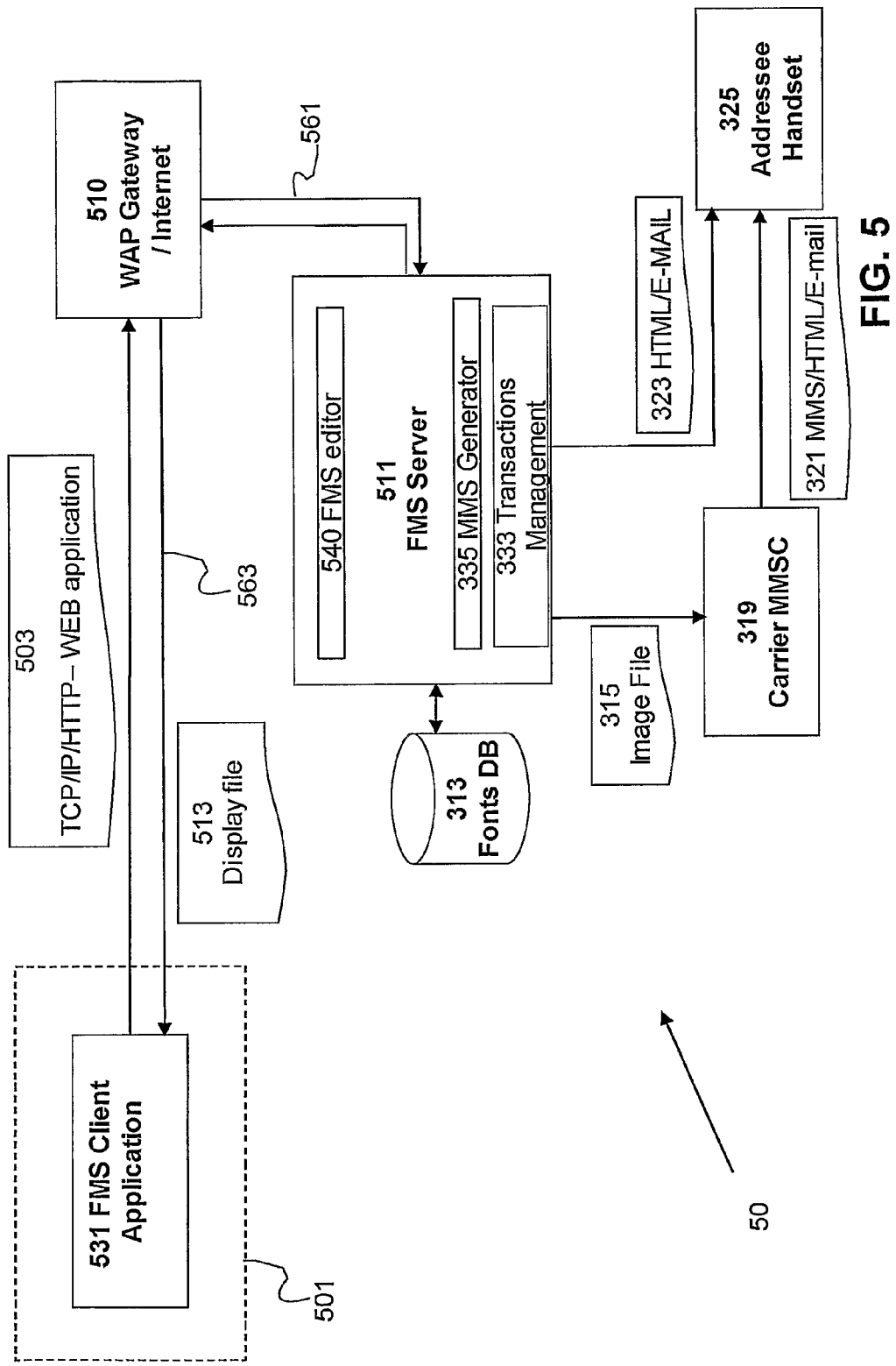
FIG. 5 is a simplified schematic illustration of a system and method of transmission and reception of rich content messages, according to embodiments of the present invention.

Reference is now made to FIG. 5 which illustrates an embodiment 50 of the present invention wherein a "thin" client application 531 is installed (step 350) on sending device 501. Client application 531 allows the user of sending device 501 to edit (step 354) a rich content message remotely using a WAP or an Internet gateway 510 on an FMS message editor 540 installed on FMS server 511. The user composes the message on-line through WAP/Internet gateway 510. When the user presses the "a" key for example, the command is sent (step 561) from client application 531 through the WAP gateway to FMS server 511. A display file 513 including character "a" in the selected font is sent (step 563) from FMS editor 540 through WAP gateway 510 to handset application 531 and displayed (step 356) on screen 21 of sending device 501.

The WEB/WAP application preferably has a permanent address, which the user can surf to (through a handset using WAP or Internet browser through a computer) and use on-line editor 540 in order to compose new FMS messages. A repository 313 of standard and designed fonts is attached to on-line editor 540. Embodiment 50 preferably doesn't require the user to download fonts. The user can see (step 356) the message in the selected fonts in real-time, and request a "preview" before sending (step 361) the message.

Font Construction:

Referring back to FIG. 2, some of the images of font 20 are formed by superimposing alphanumeric characters with a background image. An example is image 201 which is built in two layers including a character "A" and a background heart symbol. Different parameters may be chosen such as the color of the font, the color of the background e.g. heart symbol and rotational and positional parameters of both the character and the background image. Using this method of font construction, application 331, 431 or 531 on the sending device 301, 401, 501 uses a default font type which is an image of alphanumeric character and superimposed over another image which will serves as the background. This method of font constructions is very efficient in space because the same background image is used as a layer for all the characters of the default font. As an example, the user chooses a background font called "flame". By typing the "a" character, the software application will use the "a" character from the default font and put as a background the "flame" image. This method of font construction may also be used for punctuation and/or accents in languages such as Arabic, French German and Hebrew.

Voice Fonts

According to a feature of the present invention, a "Voice Font", is linked directly to the font type allowing users to add a personal touch to messages. Some fonts may be linked to a specific sound which will be attached to the sent message. As an example, if the user uses a "football" type of font which is characterized by football shape letters, the system may store in the font database a suitable sound file saying: "GOAL!" and the sound file is attached to the sent message that is created on server 311, 411 and 511. In embodiment 30, database 313 on server 311 contains sounds or voice fonts which are linked to certain fonts. A voice-font is recognized in the coded message upon arriving to remote server 311. Application 335 on server 311 attaches the audio file to the constructed message 315 and sends the sound file and image file 315 to recipient device 325.

In embodiment 40, the application 431 on sending device 401 contains voice-fonts which are linked to sound files that are preferably installed on sending device 401. When the user uses a voice-font, application 431 recognizes the font as a voice-font and adds the suitably linked sound file to the constructed MMS message 321.

Handwriting Font

A handwriting font, according to an embodiment of the present invention, preferably includes all the alphabetical letters, symbols and punctuation symbols in a person's handwriting. Handwriting font can be constructed in any language right-to-left or left-to-right or up-down. Handwriting font construction may be performed in high and regular qualities. High quality handwriting font preferably includes up to 6 graphics per character. The font produced is stored preferably as a True Type Font file or as a set of images, according to the present invention, so the font can be read by the application installed on sending device 301, 401, 501. Regular quality handwriting font uses fewer graphics per character, e.g. one graphic per character.

Figure 6:
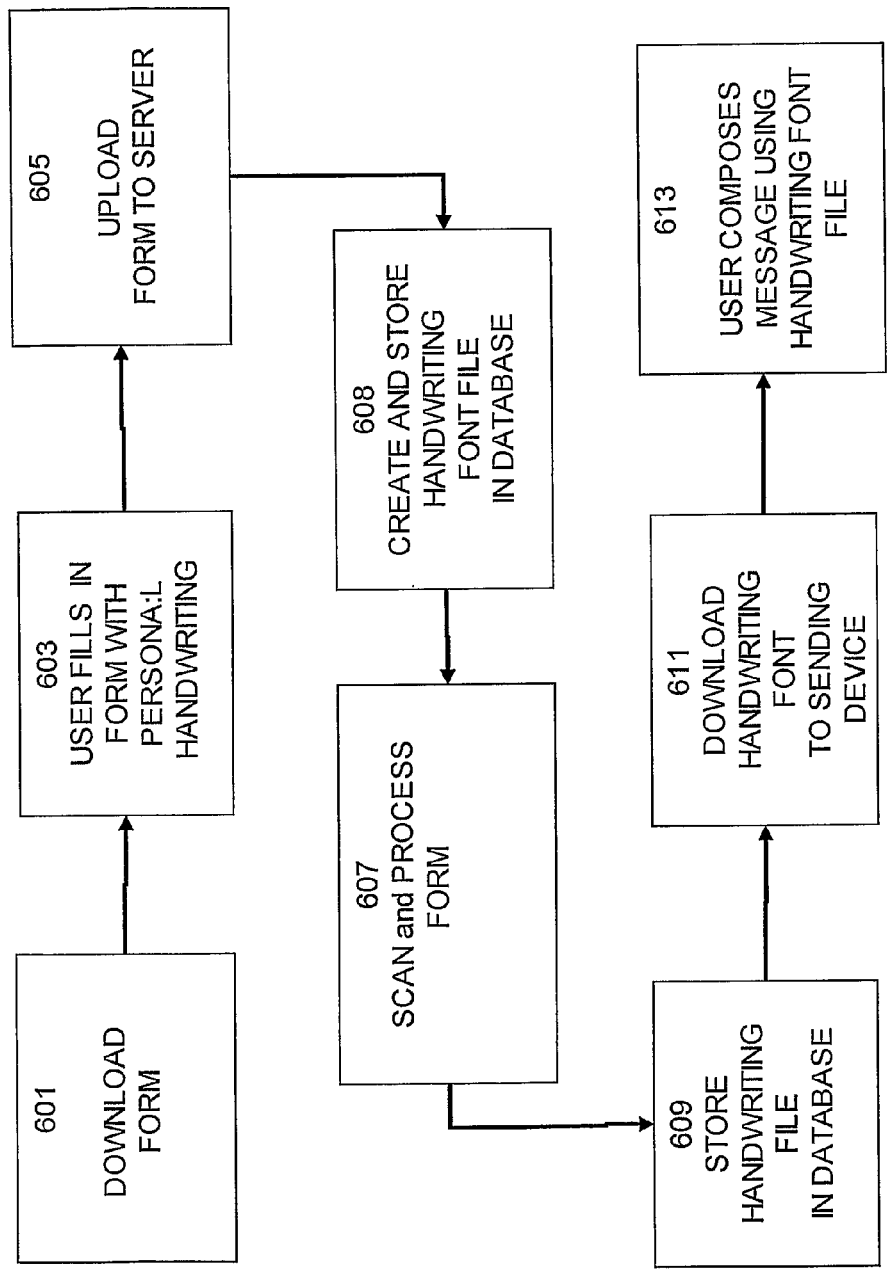
FIG. 6 is a simplified flow diagram of constructing and storing a personalized handwriting font, according to an embodiment of the present invention.

Reference is now made to FIG. 6 which illustrates a method of handwriting font construction, according to embodiments of the present invention. A form is downloaded (step 601) typically to sending device 301, 401 or 501 or other computer. A user of sending device 301, 401 or 501 fills in the form with personal handwriting typically with one or more samples of each alphanumeric character. The form is uploaded or otherwise transferred (step 605) to an application preferably installed on server 311, 411 or 511. At server 311, 411 or 511, the uploaded form is scanned and processed (step 607). A personal handwriting file (step 608) is created and preferably stored in database 313 for future use by the user. According to embodiments of the present invention, handwriting file is downloaded (step 329), selected for use, (step 352) and a message is edited (step 354) using the personalized handwriting font. The message is displayed (step 356) on sending device 301, 401, or 501 using the personalized handwriting of the user. The process of sending of message using the personal handwriting font proceeds according to any of the embodiments of the present invention as described herein.

While the invention has been described with respect to a limited number of embodiments, it will be appreciated that many variations, modifications and other applications of the invention may be made.

The invention claimed is:

1. A method for sending a text message over a telephone network from a sending device to a receiving device, the sending device not configured to support multimedia service messages, the text message comprising a set of characters, the method comprising the steps of:
   (a) selecting at least one font file, the at least one font file divided into cells, each cell associated with a specific character of the set of characters, the at least one font file having at least one code indicative of the at least one font file;
   (b) as the user enters characters of the text message on the sending device, retrieving a specific cell associated with the specific character being entered and displaying the specific cell as an image on the sending device to generate a composite image, by an application residing on the sending device;
   (c) uploading from the sending device to a server using an SMS message protocol, the text message and at least one code indicative of said at least one font file, wherein said server is operatively connected to the telephone network, the server storing the at least one font file, the receiving device not storing the at least one font file;
   (d) transmitting a message from the server to the receiving device, wherein said message includes the composite image; and
   (e) displaying the message, thereby presenting on the receiving device said composite image.

2. The method, according to claim 1, wherein said at least one font file is previously downloaded to the sending device from said server.

3. The method, according to claim 1, wherein said message is transmitted from said server to said receiving device as a multimedia message.

4. The method, according to claim 1, wherein said message is transmitted from said server to the receiving device as a text message including said at least one code.

5. The method, according to claim 1, further comprising the steps of:
   (f) editing the text message on the sending device;
   (g) encoding the text message on the sending device, thereby producing an encoded text message including characters of the text message and said at least one code; and
   (h) decoding said encoded text message at said server.

6. The method, according to claim 1, wherein said message includes sounds associated with said at least one font file.

7. The method, according to claim 5, wherein said editing includes retrieving at least one of the images from of the at least one font file, and pasting said at least one of the images into a composite image presented by an application previously installed on the sending device.

8. The method, according to claim 5, further comprising editing the text message remotely over a gateway using an application on said server.

9. A method for sending a text message over a telephone network from a sending device to a receiving device, the method comprising the steps of:
(a) selecting at least one set of images;
(b) displaying the text message using said at least one set of images on the sending device, thereby presenting a rich content message;
(c) uploading from the sending device to a server, the text message and at least one code indicative of said at least one set of images, wherein said server is operatively connected to the telephone network;
(d) transmitting a message from the server to the receiving device, wherein said message includes information of the text message and of said at least one set of images;
(e) displaying the message, thereby presenting on the receiving device said rich content message; and
(f) generating said rich content message as a composite image composed using a plurality of cells wherein for at least one character of the text message an image is selected from at least one of said cells from said at least one set of images by indicating said at least one code.

10. The method, according to claim 9, wherein said selecting is performed remotely over a gateway, further comprising the step of prior to said (b) displaying on the sending device:
(g) downloading said composite image to the sending device.

11. The method, according to claim 1, further comprising the steps of:
(f) constructing said at least one font file by superimposing a set of alphanumeric images with a set of background images; and
(g) uploading said at least one font file to the server.

12. A method for sending a text message over a telephone network from a sending device to a receiving device, the method comprising the steps of:
(a) selecting at least one set of images;
(b) displaying the text message using said at least one set of images on the sending device, thereby presenting a rich content message;
(c) uploading from the sending device to a server, the text message and at least one code indicative of said at least one set of images, wherein said server is operatively connected to the telephone network;
(d) transmitting a message from the server to the receiving device, wherein said message includes information of the text message and of said at least one set of images;
(e) displaying the message, thereby presenting on the receiving device said rich content message; and
(f) providing handwritten images of a user of the sending device;
(g) uploading said handwritten images to the server;
(h) scanning said handwritten images thereby producing said at least one set of images; and
(i) downloading said handwritten images to the sending device.

13. The method, according to claim 1, wherein the composite image is included selectably in either: a multimedia message, a web page, or attachment file to an electronic mail message.

14. A program storage device tangibly embodying a set of instructions readable by a processor installed in the sending device used in the method of claim 1 which performs the method steps of claim 1.

15. The method, according to claim 1, further comprising the step of:
(f) downloading to the sending device said at least one font file from a server.

16. The method, according to claim 1, further comprising the server forwarding the message to the receiving device as a multimedia service message without the sending device having a capability of supporting multimedia service messages.

17. The method according to claim 16, further comprising using a transactions module to determines billing based on said multimedia service message.

18. A program storage device tangibly embodying a set of instructions readable by a processor in a font server for performing the method steps of claim 16.

19. The method, according to claim 1, wherein the composite image is displayed both on the sending device and on the receiving device.

20. The method, according to claim 6, wherein said sounds include sounds generated by vibrating the receiving device.

21. A program storage device tangibly embodying a set of instructions readable by a processor installed on the sending device used in the method of claim 1, which performs the following steps:
(a) selecting at least one font file, the at least one font file divided into cells, each cell associated with a specific character of the set of characters, the at least one font file having at least one code indicative of the at least one font file;
(b) uploading from the sending device to a server, the text message using an SMS message protocol and at least one code indicative of said at least one font file, wherein said server is operatively connected to the telephone network, the server storing the at least one font file, the receiving device not storing the at least one font file;
(c) transmitting a message from the server to the receiving device, wherein said message comprises the text message and the at least one code; and
(e) displaying the message on the receiving device as a text message.

* * * * *

UNITED STATES PATENT AND TRADEMARK OFFICE
CERTIFICATE OF CORRECTION

PATENT NO. : 8,116,791 B2
APPLICATION NO. : 12/090515
DATED : February 14, 2012
INVENTOR(S) : Omer Agiv Page 1 of 1

It is certified that error appears in the above-identified patent and that said Letters Patent is hereby corrected as shown below:

Column 14:

Claim 17, line 21 should be corrected as follows:
Change:
-- using a transactions module to determines... --
to
"using a transactions module to determine...."

Signed and Sealed this
Third Day of July, 2012

David J. Kappos
*Director of the United States Patent and Trademark Office*